D. D. CHASE.
GRAIN DOOR FOR BOX CARS.
APPLICATION FILED SEPT. 22, 1911.

1,069,111.

Patented Aug. 5, 1913.

UNITED STATES PATENT OFFICE.

DOTY D. CHASE, OF FREEVILLE, NEW YORK.

GRAIN-DOOR FOR BOX-CARS.

1,069,111.  Specification of Letters Patent.  Patented Aug. 5, 1913.

Application filed September 22, 1911. Serial No. 650,668.

*To all whom it may concern:*

Be it known that I, DOTY D. CHASE, of Freeville, in the county of Tompkins and State of New York, have invented a new and useful Grain-Door for Box-Cars, of which the following is a specification.

This invention has for its object the production of a particularly simple and efficient inner door for box cars, particularly applicable for grain cars, and it consists in the combinations and constructions hereinafter set forth and claimed.

In describing this invention reference is had to the accompanying drawing in which like characters designate corresponding parts in all the views.

Figure 1:
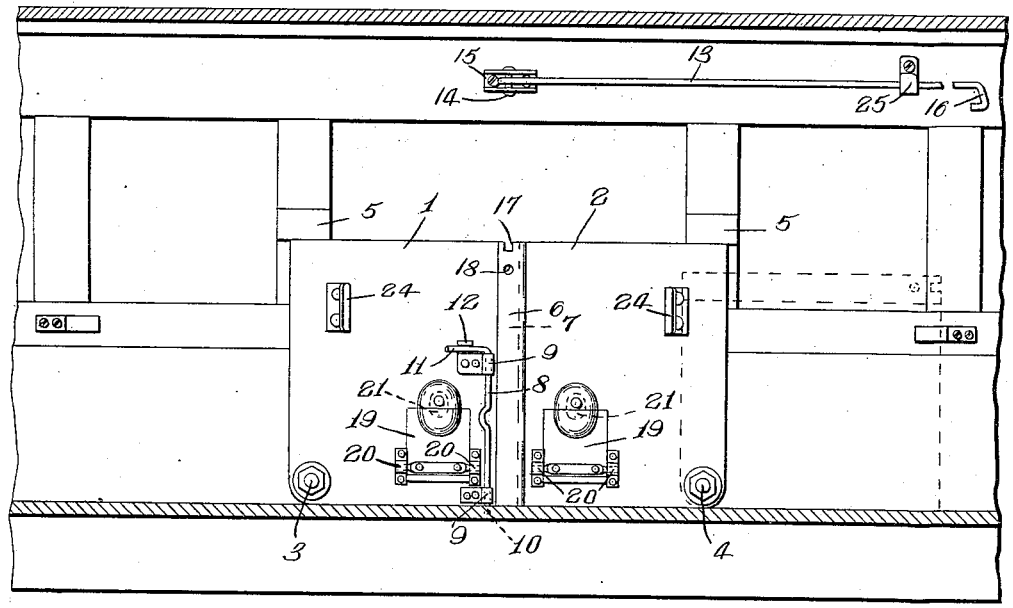
Figure 2:
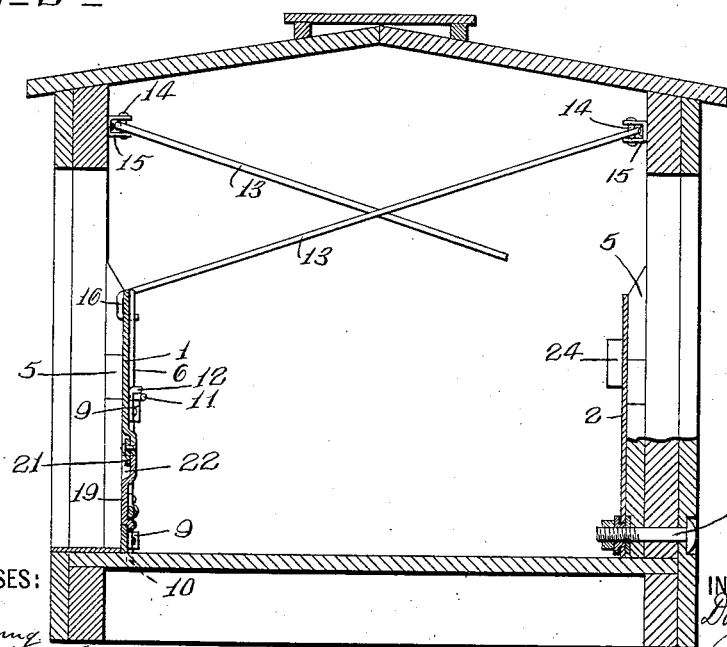

Figure 1 is a longitudinal sectional view of a portion of a box car provided with my invention, showing the inner or grain door in elevation. Fig. 2 is a cross sectional view of the body of the box car provided with my invention.

This inner door for box cars comprises, generally, sections movable in opposite directions in vertical planes and meeting substantially centrally of the doorway, the sections being pivoted at their lower outer corners to the body of the box car. Preferably the door sections are also provided with means near their meeting edges for resisting outward pressure from the interior of the car and also with doors therein which may be opened when desired to unload the car in order to permit the grain or other matter to unload by gravity until the car has been emptied sufficiently to open the door sections and permit the workmen to enter the car.

It will be understood that there are usually door sections for each of the side doors of the box car and as these door sections and coöperating parts are alike in construction it is sufficient to describe those on one side of the car only.

1 and 2 are the door sections, said sections being preferably formed of sheet metal and pivoted respectively at 3 and 4 at their lower outer corners to the body of the box car, the outer side margins of the sections 1, 2 normally bearing against the door frame 5. Preferably the meeting edges of the sections 1, 2 overlap and the overlapping margin 6 of one of the sections, as the section 2, is offset inwardly and engages the inner face of the lapping margin 7 of the other section so that the outer face of the door sections 1, 2 are flush. The door sections 1, 2 terminate some distance from the roof of the car.

The means for holding the doors and resisting outward pressure from the interior of the car, in the illustrated embodiment of my invention, comprises means for engaging the floor of the car and means secured to the upper margins of the door sections.

The means for engaging the floor of the car includes a rod or bolt 8 carried on the inner face of the door section 1, that is the section, the lapping margin of which is to the outside of the margin of the other section, the bolt 8 being slidable and movable about its axis in suitable guides 9 and having its lower end 10 movable into and out of a socket in the floor of the car.

The bolt 8 is provided at its upper end with a laterally extending handle 11 which is normally located under a shoulder 12 secured to the inner face of the door section 1, the shoulder 12 holding the bolt 8 from endwise movement when the bolt is in its normal position. By rotating the bolt 8 until its handle is disengaged from the shoulder 12, such bolt can be drawn upwardly out of operative position.

The means for engaging the upper edges of the door sections comprises a suitable member, as a tension member 13, secured at one end by a pin 14 to a bracket 15 secured near the roof of the car to the side of the car opposite to that on which the door sections are located, said member extending obliquely downwardly across the car and having a hook-shaped part 16 at its end which hooks over the upper ends of the lapping margins 6 and 7 of the door sections 1, 2 and enters alined notches 17 therein and also alined perforations 18 below the notches.

19 are the additional doors in each of the door sections 1, 2, these doors being hinged near their lower edges on horizontal axes at 20 on the inside of the doors 1, 2 and being movable downwardly into positions to form chutes. The outward movement of the doors 19 is limited by the fact that the doors 19 engage the lower edges of their doorways, this result being effected by locating the hinges 20 to the inward of the door sections 1, 2 and slightly above the lower edges of the doors 19.

The doors 19 are normally held in their closed positions by suitable devices preferably operable from the outside of the door 1, 2, these devices being here shown as buttons 21 carried by the doors 1, 2 and movable into and out of engagement with the doors 19. The buttons are located in depressions 22 formed in the doors in order that the outer face of the door sections 1, 2 will be flush so that said doors can move unobstructedly about their pivots 3, 4 past the door posts into the position indicated in dotted lines, Fig. 1. When the buttons 21 have been turned to release the doors 19 the door will be opened outwardly by the pressure of the grain or other matter within the car.

The door sections 1 and 2 are provided with suitable handles 24.

The members 13 when out of operative position may be supported on the side wall of the car by the bracket 14 and a hook 25, Fig. 1.

My door for box cars is particularly advantageous in that it is of simple construction and operation, economical of manufacture and can be readily applied to the car.

What I claim is:

1. A grain door for box cars comprising sections movable in opposite directions in vertical planes and meeting substantially centrally of the doorway, the sections being pivoted at their lower outer corners to the body of the car, means for holding the sections of the door at their upper edges comprising a member secured to the side of the car opposite to that on which the door is located and extending across the car and secured to the upper edges of the door sections, and means carried by one of the door sections and located on the inner side thereof for coacting with the floor for holding the door sections at their lower edges from outward movement, said means extending within reach from the upper edges of the door sections, substantially as and for the purpose described.

2. An inner door for box cars including sections movable in opposite directions in vertical planes and meeting substantially centrally of the doorway, the sections being pivoted at their lower outer corners to the body of the car, and having the margins of their meeting edges lapping, means for securing the door sections to the floor of the car, said means being carried by the door section having the outer lapping margin and being located on the inside of said door section within reach from the upper edges of the door sections, and a member secured to the side of the car opposite to that on which the door sections are located, said member extending across the car and being secured to the outer lapping margin whereby the door sections are held in engagement with said member by outward pressure from the interior of the car and are disengaged therefrom by inward movement of the upper edges of the door, substantially as and for the purpose specified.

3. A grain door for box cars comprising sections arranged on the interior of the car and movable in opposite directions in vertical planes, and meeting substantially centrally of the door way, the sections being pivoted at their lower outer corners to the body of the box car, and having the margins at their meeting edges lapping, and the doors being arranged so that their outer faces are substantially flush, each section being provided with a hinged door, and locking means for normally holding the door from movement, the hinged doors being arranged to be swung outwardly by pressure within the car, and the hinges thereof being located on the inner side of the door sections, the locking means being located on the outer faces of the door sections, and each door section being provided with depressions in which its locking means is located, and means for securing the doors at their meeting edges for resisting outward pressure on the doors from the interior of the car, said means being located in the interior of the door, the arrangement of the locking means for the hinged doors, the locking means for the door sections and the hinges for the hinged doors making the outer faces of the door sections substantially flush for facilitating the movement of the door sections past the door posts and permitting the door sections to set near the door posts, substantially as and for the purpose set forth.

In testimony whereof, I have hereunto signed my name in the presence of two attesting witnesses, at Freeville, in the county of Tompkins, in the State of New York, this 5th day of Aug. 1911.

DOTY D. CHASE.

Witnesses:
 F. R. WILLEY,
 E. J. SWARTWOOD.

Copies of this patent may be obtained for five cents each, by addressing the "Commissioner of Patents, Washington, D. C."